United States Patent
Sukenori

(10) Patent No.: US 8,736,682 B2
(45) Date of Patent: May 27, 2014

(54) IMAGE PROCESSING APPARATUS

(75) Inventor: Atsushi Sukenori, Higashiyamato (JP)

(73) Assignee: Casio Computer Co., Ltd., Tokyo (JP)

(*) Notice: Subject to any disclaimer, the term of this patent is extended or adjusted under 35 U.S.C. 154(b) by 118 days.

(21) Appl. No.: 13/024,433

(22) Filed: Feb. 10, 2011

(65) Prior Publication Data
US 2011/0199515 A1    Aug. 18, 2011

(30) Foreign Application Priority Data

Feb. 16, 2010 (JP) ................................ 2010-030910

(51) Int. Cl.
*H04N 5/225* (2006.01)

(52) U.S. Cl.
USPC ......... 348/169; 348/239; 348/220.1; 348/452

(58) Field of Classification Search
USPC ............... 348/239, 452, 220.1, 169; 382/294
See application file for complete search history.

(56) References Cited

U.S. PATENT DOCUMENTS

| | | | |
|---|---|---|---|
| 6,496,216 B2* | 12/2002 | Feder et al. | 348/14.09 |
| 6,999,604 B1 | 2/2006 | Kim et al. | |
| 7,675,549 B1* | 3/2010 | Brower et al. | 348/211.3 |
| 8,532,345 B2 | 9/2013 | Uchiyama | |
| 2008/0106639 A1* | 5/2008 | Bailey et al. | 348/426.1 |
| 2009/0136158 A1 | 5/2009 | Tamura | |
| 2010/0091185 A1 | 4/2010 | Ueno et al. | |
| 2010/0110300 A1 | 5/2010 | Ueno et al. | |

FOREIGN PATENT DOCUMENTS

| | | |
|---|---|---|
| CN | 101420527 A | 4/2009 |
| JP | 9-200686 A | 7/1997 |
| JP | 10-84520 A | 3/1998 |
| JP | 2002-522830 A | 7/2002 |
| JP | 2004-21374 A | 1/2004 |
| JP | 2006-31688 A | 2/2006 |
| JP | 2006-339784 A | 12/2006 |
| JP | 2007-013951 A | 1/2007 |
| JP | 2008-084171 A | 4/2008 |
| JP | 2008-301043 A | 12/2008 |
| JP | 2009-147922 A | 7/2009 |
| WO | WO 2008/136286 A1 | 11/2008 |

OTHER PUBLICATIONS

Japanese Office Action dated Jul. 12, 2011 (and English translation thereof) in counterpart Japanese Application No. 2010-030910.
Chinese Office Action dated Aug. 6, 2013 (and English translation thereof) in counterpart Chinese Application No. 201110081467.X.

* cited by examiner

*Primary Examiner* — Roberto Velez
*Assistant Examiner* — Yih-Sien Kao
(74) *Attorney, Agent, or Firm* — Holtz Holtz Goodman & Chick PC

(57) ABSTRACT

There is provided an image processing apparatus. The apparatus includes a moving image data acquisition unit configured to acquire moving image data representing a moving image, a notable-region specification unit configured to specify, as a notable region, a motion region among a plurality of still images forming the moving image represented by the moving image data acquired by the moving image data acquisition unit, for each still image, and an image processing unit configured to perform image processing of changing a style of each still image, in which the notable region is specified by the notable-region specification unit, into a pictorial image, by using different processes between the notable region in the still image specified by the notable-region specification unit and the rest of the still image.

3 Claims, 7 Drawing Sheets

IMAGE PROCESSING APPARATUS

CROSS-REFERENCE TO RELATED APPLICATIONS

This application is based upon and claims the benefit of priority from prior Japanese Patent Application No. 2010-030910, filed Feb. 16, 2010, the entire contents of which are incorporated herein by reference.

BACKGROUND OF THE INVENTION

1. Field of the Invention

The present invention relate to an image processing apparatus.

2. Description of the Related Art

As a known image processing technique, Jpn. Pat. Appln. KOKAI Publication No. 2006-031688 ("patent document 1") discloses an image processing apparatus in which a pixel value or the like that specifies a notable region in an image is prestored, the notable region is specified by using this pixel value from an image represented by image data acquired by, for example, a digital camera, and the specified notable region is emphasized more than other regions.

Also, Jpn. Pat. Appln. KOKAI Publication No. 2004-021374 ("patent document 2") discloses an image processing apparatus in which subject data for identifying a feature of, for example, the face of a subject is prestored, a subject region in which the subject exists in an image is specified as a notable region by using this subject data, and the specified notable region is emphasized more than other regions.

In the conventional techniques, however, prestored predetermined data for specifying a notable region in an image is used to specify the notable region in a still image. Therefore, when performing image processing on a still image forming a moving image, for example, a motion region (e.g., a region containing a moving subject) in the moving image cannot accurately be specified. Consequently, image processing (of changing the style of an image) of the same degree is performed on the motion region and another region without distinguishing between them. This makes it difficult for a user to perceive the motion region in the moving image having the changed image style.

BRIEF SUMMARY OF THE INVENTION

Accordingly, it is an object of the present invention to provide an image processing apparatus that allows a user to readily perceive a motion region in a moving image changed to a different image style.

According to one aspect of the present invention, there is provided an image processing apparatus. The apparatus includes a moving image data acquisition unit configured to acquire moving image data representing a moving image, a notable-region specification unit configured to specify, as a notable region, a motion region among a plurality of still images forming the moving image represented by the moving image data acquired by the moving image data acquisition unit, for each still image, and an image processing unit configured to perform image processing of changing a style of each still image, in which the notable region is specified by the notable-region specification unit, into a pictorial image, by using different processes between the notable region in the still image specified by the notable-region specification unit and the rest of the still image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A and 4B are views showing a still image as a target of the image processing, which is divided into blocks having a predetermined size, and a still image before that;

FIGS. 6A and 6B are views showing a still image as a target of image processing and a still image acquired before that.

DETAILED DESCRIPTION OF THE INVENTION

Figure 1:
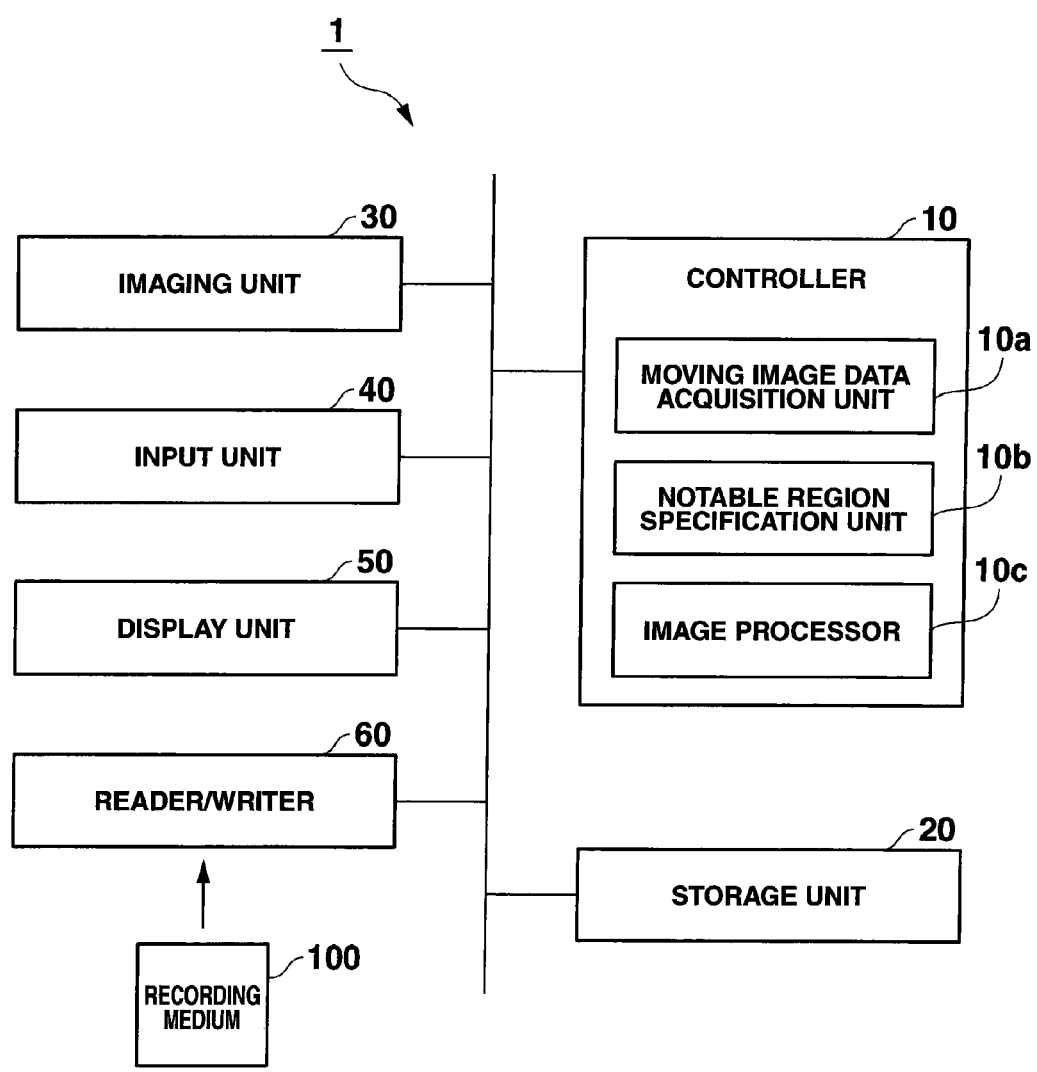
FIG. 1 is a block diagram showing the functions of an image processing apparatus according to an embodiment of the present invention.

An embodiment according to the present invention will be explained below with reference to the accompanying drawing. In this embodiment, a mode in which an image processing apparatus 1 according to the present invention is implemented by a digital camera will be explained. The image processing apparatus 1 has, as imaging modes, a picture image mode in addition to a general still-image imaging mode and moving-image imaging mode.

In the picture image mode, frame data ("original image data" hereinafter) representing an image are sequentially acquired at a preset frame rate from the timing at which the user performs an operation of selecting the picture image mode from a menu window, image processing of converting the image represented by the acquired original image data (the original image data is appropriately changed into predetermined image data) into a pictorial image is performed to generate picture image data, and a picture image represented by the picture image data is displayed as a live view on the display screen. The pictorial image (picture image) is an image having a style different from that of the original photographic image, and looking like, for example, an oil painting, torn paper collage, or Indian ink painting.

First, the arrangement of the image processing apparatus 1 will be explained with reference to FIG. 1. The image processing apparatus 1 includes a controller 10, storage unit 20, imaging unit 30, input unit 40, display unit 50, and reader/writer 60.

The controller 10 controls each unit of the image processing apparatus 1 and also controls the whole image processing apparatus 1. The controller 10 includes a moving image data acquisition unit 10a, notable-region specification unit 10b, and image processor 10c which specify a motion region (notable region) in a moving image represented by moving image data, and perform image processing on the specified notable region by using processes different from those for other regions. A moving image herein mentioned is an image formed by a plurality of successive still images.

The storage unit 20 appropriately stores, for example, various kinds of data generated by the controller 10 during processing, and recording image data read from a recording medium 100 by the reader/writer 60, under the control of the controller 10.

The imaging unit 30 captures an image at a predetermined frame rate under the control of the controller 10. The imaging unit 30 generates an image signal representing the captured image, and generates digital original image data (still image data of one frame) based on the generated image signal. The imaging unit 30 supplies the generated original image data to the controller 10.

The input unit 40 is an operation unit that receives user's operation inputs. The input unit 40 supplies operation input data corresponding to the nature of a received operation input to the controller 10.

The display unit 50 displays an image captured by the imaging unit 30, an operation window, and a recording image representing recording image data read from the recording medium 100 by the reader/writer 60, under the control of the controller 10.

The reader/writer 60 reads recording image data recorded in the recording medium 100, and supplies the read data to the controller 10, under the control of the controller 10. Also, the reader/writer 60 writes (records) image data in the recording medium 100 under the control of the controller 10.

The recording medium 100 stores moving image data or still image data as recording image data.

Figure 2:
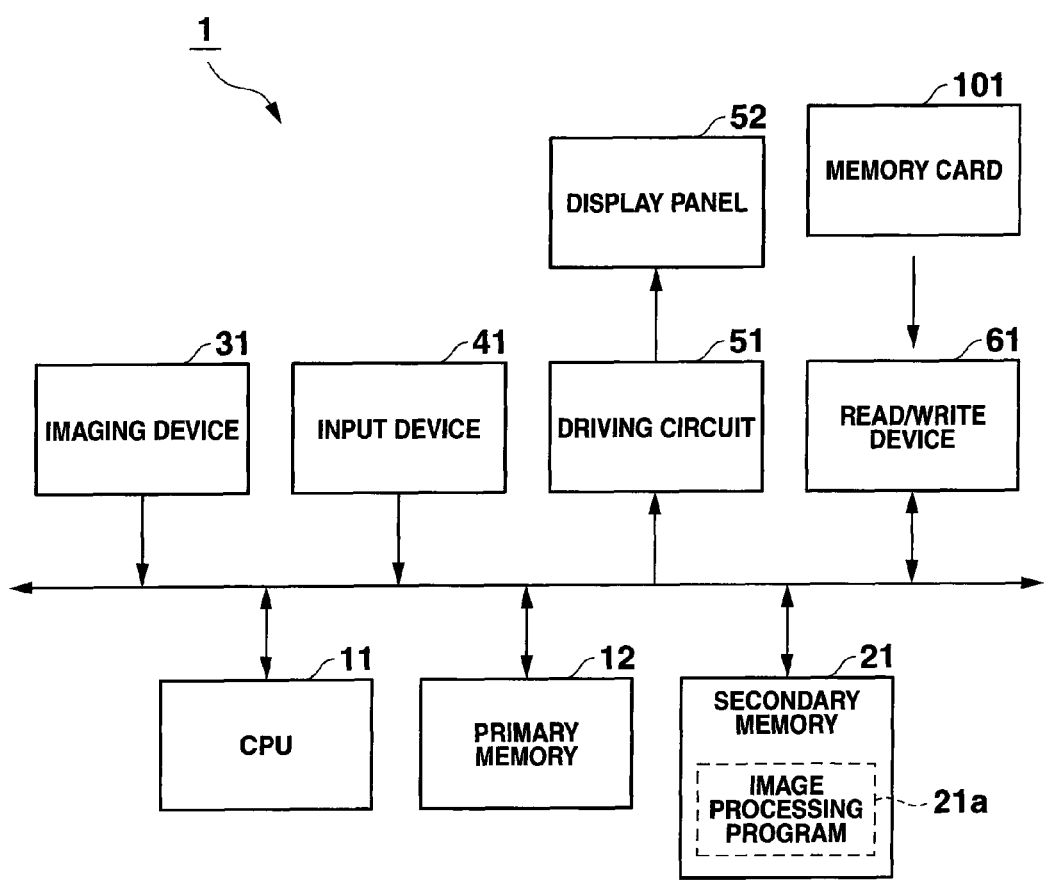
FIG. 2 is a block diagram showing the hardware configuration of the image processing apparatus according to the embodiment of the present invention.

Next, the hardware configuration of the image processing apparatus 1 will be explained below with reference to FIG. 2. The image processing apparatus 1 includes a central processing unit (CPU) 11, primary memory 12, secondary memory 21, imaging device 31, input device 41, driving circuit 51, display panel 52, and read/write device 61.

The controller 10 shown in FIG. 1 is implemented by the CPU 11 and primary memory 12. The CPU 11 controls the whole image processing apparatus 1 in accordance with an image processing program 21a loaded into the primary memory 12 from the secondary memory 21. In particular, the CPU 11 actually performs processing performed by the moving image data acquisition unit 10a, notable-region specification unit 10b, and image processor 10c of the controller 10 shown in FIG. 1. The controller 10 may also include an application-specific integrated circuit (ASIC) or the like. In this case, the ASIC or the like performs at least a part of the processing performed by the CPU 11.

The primary memory 12 is implemented by a random access memory (RAM) or the like. The primary memory 12 functions as, for example, a working memory of the CPU 11. Data received by the CPU 11 from other constituent elements (e.g., the imaging device 31) and data to be supplied by the CPU 11 to other constituent elements (e.g., the driving circuit 51) are temporarily recorded in the storage area of the primary memory 12. The CPU 11 reads data recorded in the primary memory 12, performs an arithmetic operation (processing) by using the read data, and records data as the operation result (processing result) in the primary memory 12 at any time.

The storage unit 20 shown in FIG. 1 is implemented by the secondary memory 21. The secondary memory 21 is, for example, a flash memory or hard disk. Also, the secondary memory 21 stores the image processing program 21a. The CPU 11 loads the image processing program 21a stored in the secondary memory 21 into the primary memory 12, and performs processing based on commands of the image processing program 21a loaded into the primary memory 12.

The imaging unit 30 shown in FIG. 1 is implemented by the imaging device 31. The imaging device 31 is, for example, a camera including an imaging element such as a charge-coupled device (CCD) image sensor or complementary metal oxide semiconductor (CMOS) image sensor, an analog front end (AFE), and a digital signal processor (DSP).

The imaging device 31 generates an image signal representing a captured image by using the imaging element, and performs various kinds of processing (performed by, for example, the AFE and DSP) on the generated image signal, thereby generating digital original image data. Note that examples of the various kinds of processing are correlated double sampling, automatic gain control of a sampled image signal, analog-to-digital conversion for digitizing an analog image signal having undergone automatic gain control, and image quality enhancement such as contour emphasis, automatic white balance, and auto-iris control.

Original image data represents a still image of one frame (one captured image) captured by the imaging element. Whenever generating original image data, the imaging device 31 supplies the generated data to the primary memory 12. The primary memory 12 stores the original image data received from the imaging device 31. The CPU 11 performs processing (described later) by using the original image data stored in the primary memory 12.

The input unit 40 shown in FIG. 1 is implemented by the input device 41. The input device 41 is an interface device which includes a plurality of operation keys such as an imaging key, playback key, stop key, menu key, image conversion mode selection key, set key, and power key, and is operated by the user. When the user operates any of these keys, the input device 41 supplies operation input data corresponding to the key to the primary memory 12. The primary memory 12 receives the operation input data supplied from the input device 41, and stores the received operation input data. The CPU 11 performs processing (described later) in accordance with the operation input data stored in the primary memory 12.

The display unit 50 shown in FIG. 1 is implemented by the driving circuit 51 and display panel 52. The CPU 11 generates display data (e.g., red-green-blue [RGB] data) by using various kinds of image data, and supplies the generated display data to the driving circuit 51. The driving circuit 51 drives the display panel 52 based on the received display data, and displays various images represented by the various kinds of image data on the display panel 52.

The display panel 52 is, for example, a liquid crystal display panel or organic electroluminescent (OEL) display panel. The driving circuit 51 displays various images on the display panel 52.

Note that the input unit 40 and display unit 50 shown in FIG. 1 may also be implemented by a touch panel. In this case, the input device 41 and display panel 52 are implemented by the touch panel. The touch panel displays an input window for receiving predetermined operations, and supplies, to the primary memory 12, operation input data corresponding to a position where the user has performed a contact operation in the input window. The primary memory 12 receives the operation input data supplied from the touch panel, and stores the received operation input data. The CPU 11 performs processing (described later) in accordance with the operation input data stored by the primary memory 12.

The reader/writer 60 shown in FIG. 1 is implemented by the read/write device 61. The read/write device 61 is an interface device for performing data read and write. The read/write device 61 reads recording image data (still image data or moving image data) recorded in the recording medium 100, and supplies the read recording image data to the primary memory 12. The primary memory 12 receives the recording image data supplied from the read/write device 61, and stores the received recording image data. The CPU 11 performs processing (described later) by using the recording image data stored by the primary memory 12.

The recording medium 100 is implemented by, for example, a flash memory type memory card 101. An example of the memory card 101 is an SD memory card for recording the recording image data.

Figure 3:
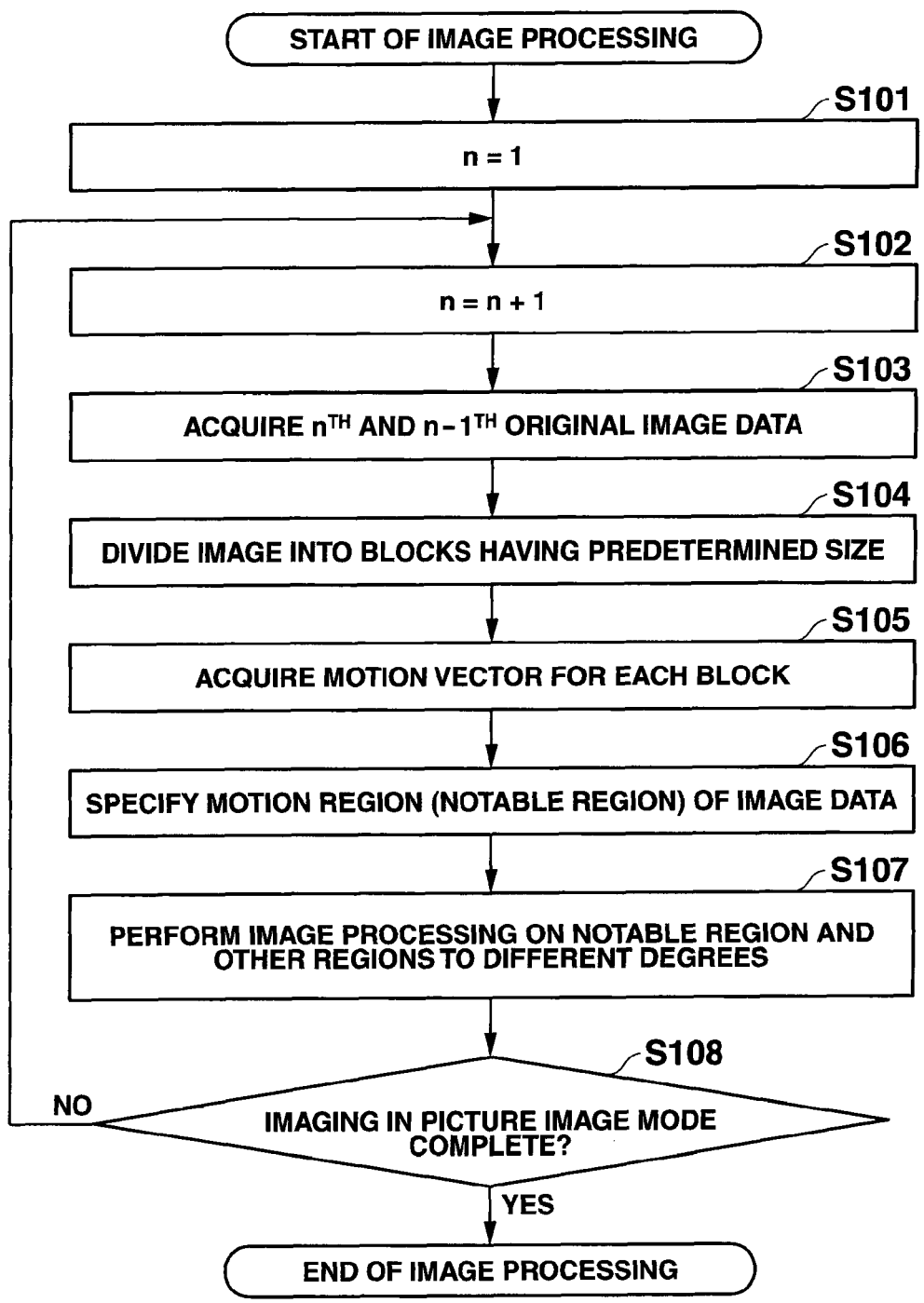
FIG. 3 is a flowchart showing image processing performed by the image processing apparatus according to the embodiment of the present invention.

Image processing performed by the image processing apparatus 1 will be explained below with reference to FIG. 3.

The user performs an operation of selecting the picture image mode from the menu window displayed on the display unit 50 after the power supply is turned on, by using the input unit 40. The user also performs an operation of selecting the type of pictorial image, for example, a watercolor painting, color sketch, pastel drawing, pointillistic painting, air brush illustration, oil painting, or gothic oil painting. The input unit 40 supplies, to the controller 10, operation input data corresponding to the inputs of the operations of selecting the picture image mode and pictorial image type.

The controller 10 starts image processing (start of image processing shown in FIG. 3) by receiving the operation input data from the input unit 40.

In this image processing, the moving image data acquisition unit 10*a* controls the driving of the imaging unit 30 to cause it to capture an image at a preset frame rate. The moving image data acquisition unit 10*a* sequentially acquires the frames of original image data generated by the imaging unit 30, and stores (temporarily records) the acquired frames in the order of acquisition in a predetermined storage area (e.g., the primary memory 12 shown in FIG. 2). The controller 10 (moving image data acquisition unit 10*a*) may also perform the image quality improving processes such as contour emphasis, automatic white balance, and auto-iris control. In this case, the controller 10 (moving image data acquisition unit 10*a*) generates (acquires) original image data by performing the above-mentioned processing by using the data acquired from the imaging unit 30.

Whenever the moving image data acquisition unit 10*a* acquires original image data of one frame, the notable-region specification unit 10*b* performs the process of specifying a notable region in a still image represented by the original image data. The notable-region specification unit 10*b* sets n=1 (step S101). This n indicates the order of original image data acquired for each frame by the moving image data acquisition unit 10*a*. After that, the notable-region specification unit 10*b* sets n=n+1 (step S102). That is, this image processing target is the $n^{th}$ (second) original image data.

The notable-region specification unit 10*b* acquires the $n^{th}$ and $n-1^{th}$ original image data (step S103). That is, the notable-region specification unit 10*b* acquires, from a predetermined storage area (e.g., the primary memory 12 shown in FIG. 2), original image data acquired for the $n^{th}$ (second) time and the $n-1^{th}$ (first) time by the moving image data acquisition unit 10*a*.

Figure 4A:
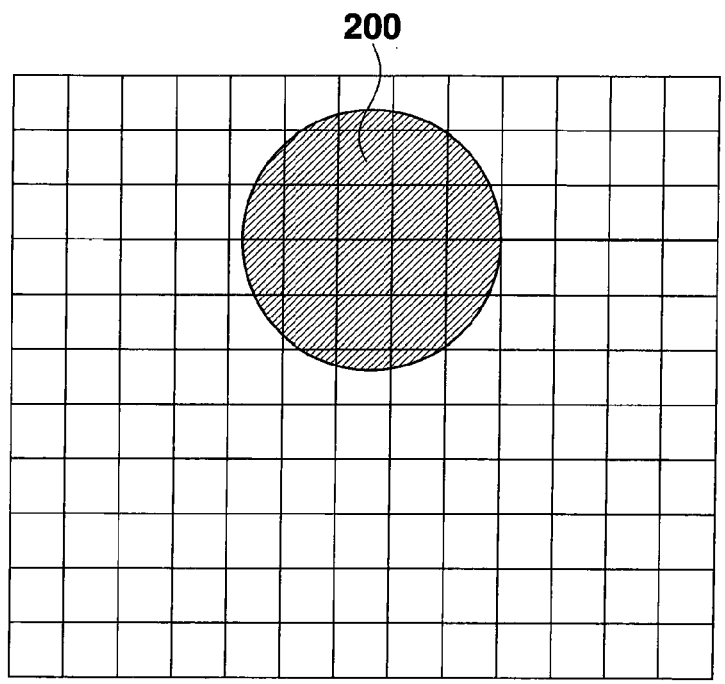
Figure 4B:
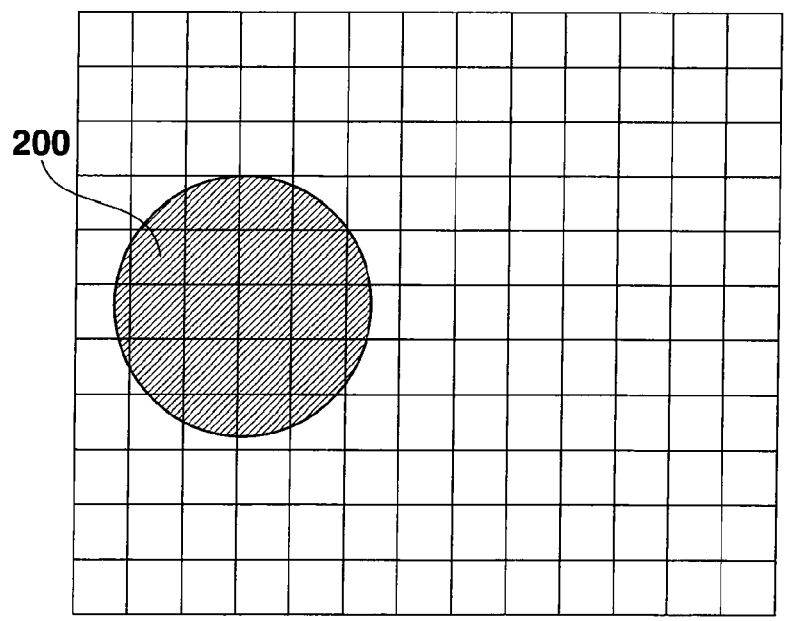

By using the $n^{th}$ (second) original image data as an image processing target and the $n-1^{th}$ (first) image data acquired before that, the notable-region specification unit 10*b* divides still images represented by these data into blocks having a predetermined size as shown in FIGS. 4A and 4B (step S104). For example, the notable-region specification unit 10*b* divides each still image into 8×8-pixel blocks. Note that in processing after that, the original image data is appropriately changed into a predetermined readily processable data format.

Each divided block is specified by identification data (e.g., a block number) with which the block is uniquely identifiable. For example, a block in the upper left corner of the image is assigned block number "1", and block numbers are assigned to blocks rightward from the block of block number "1" toward a block in the upper right corner. After this block in the upper right corner is assigned block number m, block number m+1 is assigned to a block immediately below the block in the upper left corner of the image. Thus, the blocks divided in each still image are specified by the block numbers. Note that the sizes of blocks to be divided can appropriately be set, and need not be uniform. Note also that the sizes of blocks to be divided remain the same during processing.

The notable-region specification unit 10*b* compares corresponding blocks in the still images, and acquires the motion vector of the $n^{th}$ (second) original image as an image processing target for each block (step S105). That is, the notable-region specification unit 10*b* compares a still image (FIG. 4A) represented by the $n^{th}$ (second) original image data with a still image (FIG. 4B) represented by the $n-1^{th}$ (first) original image data by using the $n^{th}$ (second) original image data as an image processing target and the $n-1^{th}$ (first) original image data acquired before that, thereby acquiring, for each block, a motion vector indicating the moving distance and moving direction from an original image represented by the $n-1^{th}$ (first) original image data to an original image represented by the $n^{th}$ (second) original image data.

The notable-region specification unit 10*b* specifies a block for which the motion vector acquired for each block of the $n^{th}$ (second) original image data is greater than or equal to a preset motion vector threshold value (or exceeds the threshold value) (step S106). This specified block is processed as a motion region (e.g., a region containing a moving subject) in which, for example, the moving distance of the subject between the still images satisfies a predetermined criterion.

Figure 5:
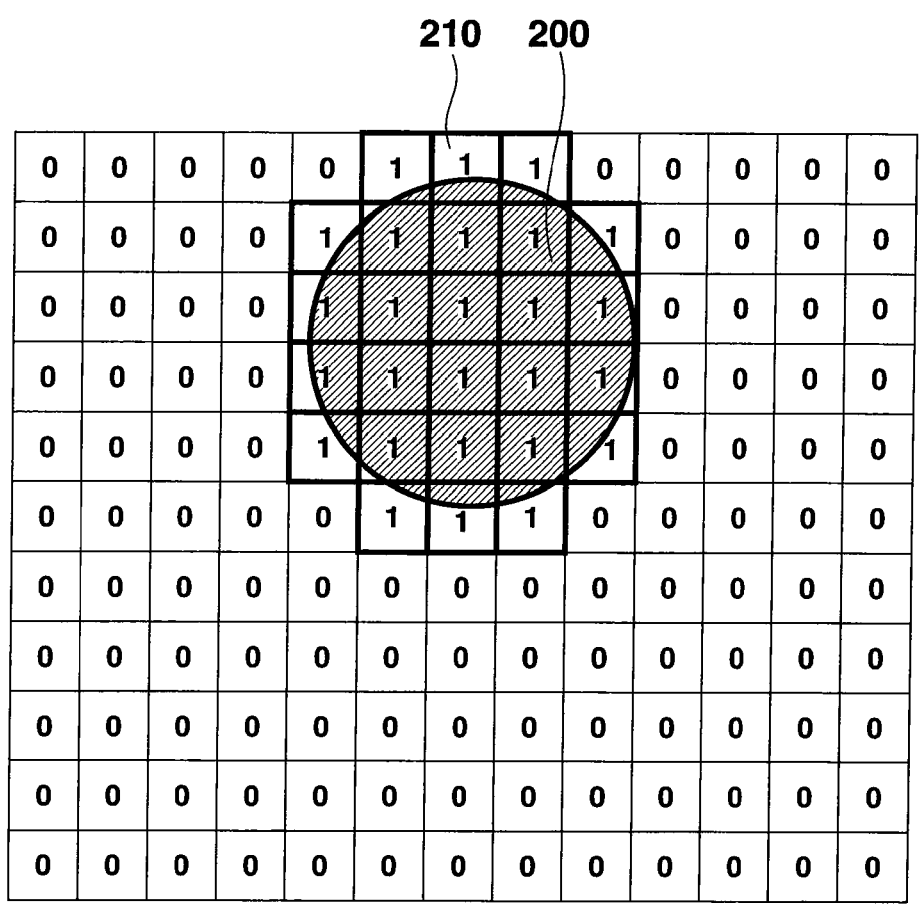
FIG. 5 is a view showing an image of data assigned to each divided block having the predetermined size, and representing a notable region or other regions.

More specifically, the notable-region specification unit 10*b* determines, for each block, whether the motion vector acquired for the block is greater than or equal to the motion vector threshold value (or exceeds the threshold value). If the motion vector of the block is greater than or equal to the motion vector threshold value (or exceeds the threshold value), the notable-region specification unit 10*b* determines that the block is a motion region (notable region), and assigns data "1" indicating a notable region (motion region) to the block (block number) of the $n^{th}$ original image as shown in for example, FIG. 5. On the other hand, if the motion vector of the block is less than the motion vector threshold value (or less than or equal to the threshold value), the notable-region specification unit 10*b* determines that the block is a motionless region (a region other than the notable region), and assigns data "0" indicating a region other than the notable region (a motionless region). This enables the notable-region specification unit 10*b* to specify a group of blocks 210 including a subject 200 moving in the still image represented by the $n^{th}$ (second) original image data.

After that, the image processor 10*c* performs image processing of converting the $n^{th}$ (second) original image data into pictorial image data in accordance with the pictorial image type selected by the user by using the input unit 40 when selecting the picture image mode. For example, when a watercolor painting is selected by the user, the image processor 10c generates picture image data representing a picture image looking like a watercolor painting by changing various parameters of the $n^{th}$ (second) original image data. The parameters herein mentioned are numerical values defining the processing degree of the image processing of changing an image into a pictorial image. The parameters include various parameters indicating, for example, the brightness, contrast, color density, hue, and sharpness. The parameters are defined for each pictorial image type (image processing type). Note that an example of this image processing of converting original image data into pictorial image data is processing performed by various filters used in Photoshop®.

The image processor 10c performs image processing on the block specified as a notable region by the notable-region specification unit 10b and other regions (blocks) by using different processing degrees (step S107). The processing degree of the image processing is controlled by increasing or decreasing the numerical values of the various parameters. More specifically, the image processor 10c increases the processing degree of image processing to be performed on an image portion of the notable region, and decreases the processing degree of image processing to be performed on image portions of regions other than the notable region. That is, the image processor 10c performs image processing on an image portion of a block assigned data "1" indicating a notable region by increasing the numerical values (reference values) of various preset parameters. Consequently, this image portion is finely drawn, and the texture of a pictorial image is finely rendered. On the other hand, the image processor 10c performs image processing on an image portion of a block assigned data "0" indicating a region other than a notable region by decreasing the numerical values (reference values) of the various preset parameters. As a consequence, this image portion is coarsely drawn, and the texture of a pictorial image is coarsely rendered.

In this embodiment as described above, when the numerical values of the various parameters increase, the processing degree of the image processing increases, and the texture of a pictorial image becomes fine. On the other hand, when the numerical values of the various parameters decrease, the processing degree of the image processing decreases, and the texture of a pictorial image becomes rough. Note that the relationship between the processing degree, the numerical values of the parameters, and the roughness/fineness of the texture is not limited to this. Note also that the relationship changes in accordance with the type of pictorial image, and is preset. In this embodiment, the image processor 10c performs image processing of representing a notable region with a fine texture, and representing other regions with a texture rougher than that of the notable region, by changing the processing degree. Note that the image processor 10c is not limited to this example, and can also perform image processing of changing the processing degree so that the degree of conversion of a notable region from an original image differs from that of other regions.

The image processor 10c generates picture image data based on the $n^{th}$ (second) original image data by performing the above-mentioned image processing on all blocks. The image processor 10c records the generated picture image data in a predetermined storage area (e.g., the primary memory 12 shown in FIG. 2). In addition, the image processor 10c converts the picture image data into display data, and supplies the display data to the display unit 50. Under the control of the image processor 10c, the display unit 50 (the display panel 52 shown in FIG. 2) displays a picture image represented by the received picture image data.

After that, the moving image data acquisition unit 10a, notable-region specification unit 10b, and image processor 10c repeat the same processing as above (steps S102 to S107), and, whenever the moving image data acquisition unit 10a acquires original image data of one frame from the imaging unit 30, picture image data of one frame is generated based on the original image data, until the controller 10 determines that imaging in the picture image mode is complete (Yes in step S108).

Also, whenever generating picture image data of one frame, the image processor 10c records the picture image data in the storage area (the primary memory 12 shown in FIG. 2), converts the picture image data into display data, and supplies the display data to the display unit 50. The display unit 50 (the display panel 52 shown in FIG. 2) displays a picture image represented by the display data as a live view.

The user checks the picture image displayed as a live view on the display unit 50 (the display panel 52 shown in FIG. 2), and operates the imaging start key. The image processor 10c determines that imaging is to be started, and records picture image data sequentially acquired frame-by-frame in the storage area (the primary memory 12 shown in FIG. 2) from the timing of the operation. When the user operates the imaging end key, the image processor 10c can record, in the secondary memory 21, memory card 101, or the like, moving image data formed by a plurality of successive picture image data recorded from the timing of the operation. Note that when the user operates the imaging start key and imaging end key, it is also possible to record moving image data formed by a plurality of successive original image data recorded in a predetermined storage area (the primary memory 12 shown in FIG. 2) by the moving image data acquisition unit 10a.

Note that (first) original image data acquired for the first time by the moving image data acquisition unit 10a undergoes predetermined image processing in this embodiment, because there is no image data that can be compared with the first original image data. For example, (first) original image data acquired for the first time is divided into a central region and the rest in a still image represented by the original image data, based on a central region of a preset image, and image processing is performed such that an image portion corresponding to the central region is finely drawn, and an image portion corresponding to the rest is coarsely drawn. That is, the image processor 10c increases the processing degree of image processing for the image portion corresponding to the central region in the still image by increasing the numerical values of the parameters, thereby finely rendering the texture of a pictorial image. On the other hand, the image processor 10c decreases the processing degree of image processing for the image portion corresponding to the region other than the central region in the still image by decreasing the numerical values of the parameters, thereby coarsely rendering the texture of the pictorial image.

Figure 6A:
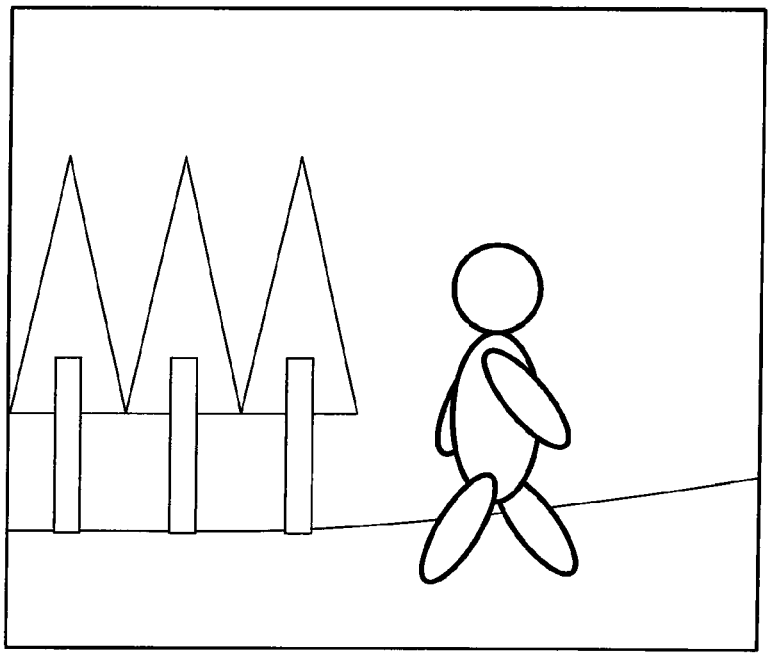
Figure 6B:
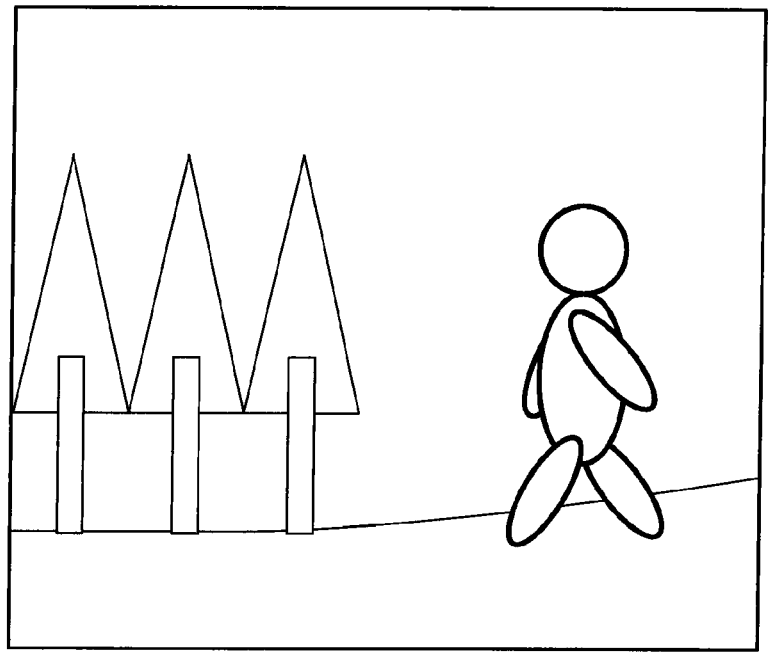
Figure 7:
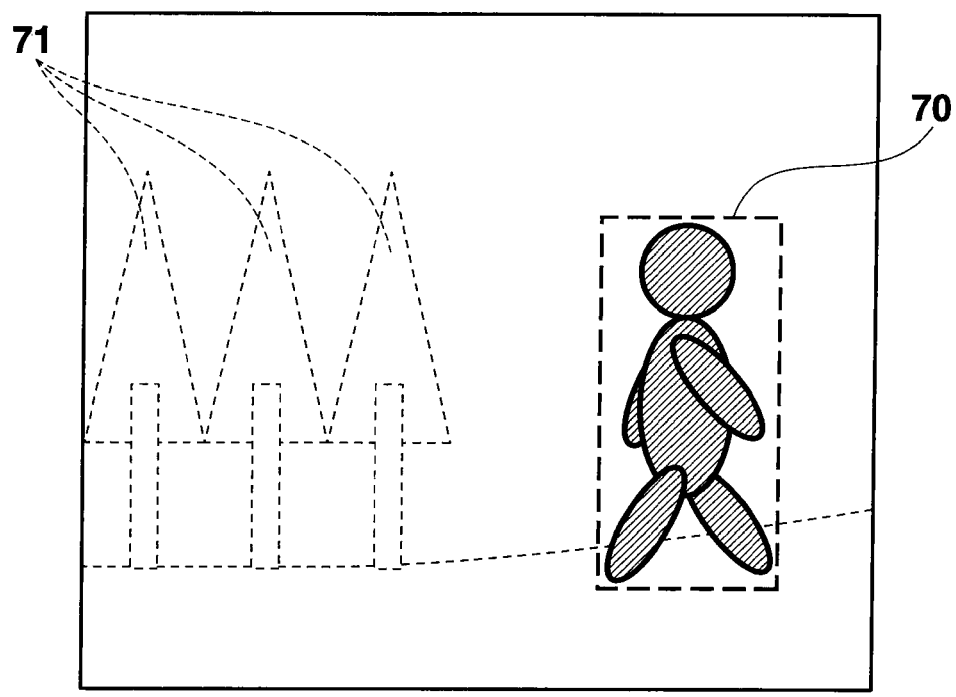
FIG. 7 is a view showing an image in which image processing is performed on a notable region and other regions by using different processes.

In the image processing apparatus 1 according to this embodiment, of a plurality of still images represented by moving image data (in this embodiment, a group of successively acquired original image data), a still image (e.g., FIG. 6A) as an image processing target and a still image (e.g., FIG. 6B) acquired before that are used to specify a motion region between the still images as a notable region, and image processing of changing the style of a still image is performed such that a notable region 70 and other regions 71 in the specified still image are processed by means of different processes, as shown in FIG. 7. This allows the user to readily perceive a motion region in a moving image converted into a pictorial image. In addition, the image processing consisting of different processes enables the user to readily perceive the feature of the motion region.

In the image processing apparatus 1 according to this embodiment, the notable-region specification unit 10b specifies, as a notable region, a region in which, for example, the moving distance of a subject, which represents a change between still images, satisfies a predetermined criterion. Therefore, only a region (that is, a region exhibiting large motion) in which, for example, the moving distance of a subject between still images satisfies a predetermined criterion can be specified as a notable region.

In the image processing apparatus 1 according to this embodiment, the notable-region specification unit 10b divides each of a plurality of still images forming a moving image represented by moving image data into blocks having a predetermined size, and specifies, for each divided block, a region (block) in which a change between still images in corresponding blocks of the still images satisfies a predetermined criterion, as a notable region. This makes it possible to distinguish between the notable region and other regions for each block.

Note that in this embodiment, after the series of processes in steps S102 to S107 are performed, the next original image data is set as an image processing target, for the convenience of explanation. However, it is also possible to perform image processing on the next original image data whenever each step is complete.

Furthermore, moving image data as a target of the image processing performed by the image processing apparatus 1 includes a combination of a plurality of still image data each representing a still image of one frame (see the above description), and a combination of reference image data representing a reference image (normally a plurality of images) of one frame by using a video compression method such as Moving Picture Experts Group (MPEG) compression and a plurality of difference data indicating the differences from the reference image.

For example, in the above embodiment, the image processing apparatus 1 displays, as a live view, a picture image represented by picture image data sequentially generated by performing imaging in the picture image mode. However, it is also possible to perform the same image processing (steps S101 to S107 shown in FIG. 3) as that of the above embodiment by using moving image data stored in, for example, the storage unit 20 or recording medium 100. In this case, the image processing apparatus 1 (notable-region specification unit 10b) compares the initial (first) original image data with the next (second) original image data, and specifies, as a notable region, a region exhibiting motion greater than or equal to a predetermined criterion in a still image represented by the initial (first) original image data. Thus, image processing is performed on an image portion of the notable region in the still image represented by the initial (first) original image data, and on an image portion of the rest, by using different processes. Note that in this processing, the original image data can also have a data format such as Joint Photographic Experts Group (JPEG) format. In this case, the original image data is appropriately converted into a data format readily processable in the above-mentioned processing.

When moving image data stored in, for example, the storage unit 20 or recording medium 100 is data obtained by a data compression method such as Moving Picture Experts Group (MPEG) compression, still images forming a moving image represented by the moving image data are reproduced on the data, and the above-mentioned processing is performed on each still image.

As another embodiment, the image processing apparatus 1 can also detect an image of the face of a human or animal in a moving image represented by moving image data, and specify a motion region in the face image as a notable region.

More specifically, in the image processing apparatus 1, the moving image data acquisition unit 10a acquires moving image data. The notable-region specification unit 10b compares each region of a template face image representing the feature of a predetermined face with the same region of a still image represented by the initial (first) original image data while shifting the images pixel-by-pixel in the horizontal or vertical direction. The notable-region specification unit 10b detects an image of the face of a subject by searching for an image (having a high similarity) best matching the template face image. This search is performed by, for example, extracting feature amounts effective to identify the face. Examples of the feature amounts are the horizontal edge, vertical edge, rightward oblique edge, and leftward oblique edge. Note that in this processing, it is also possible to detect an image of the face of a subject by reducing or enlarging the template face image at a predetermined ratio, and searching for an image best matching the reduced or enlarged template face image.

Image processing after that (from the second original image data) is performed by a tracking process. That is, the face image of the subject detected from the first image is used as a template image, and the same matching process as described above is performed between this template image and images represented by sequentially acquired original image data. This makes it possible to sequentially detect face images of the subject.

The notable-region specification unit 10b detects a face image of the subject in each of a still image represented by the original image data as an image processing target, and a still image represented by original image data acquired before that, and specifies, as a notable region, a region of a face image exhibiting motion greater than or equal to a predetermined criterion (a region in which the face image has moved a distance greater than or equal to the predetermined criterion in the still image). Based on this notable region, the image processor 10c performs the image processing of changing the style of a still image on the specified notable region and other regions in the still image by means of different processes, in the same manner as in the above embodiment. This allows the user to readily perceive a moving face image region in a moving image converted into a pictorial image.

In particular, this method can specify a face image region in each still image as a notable region, unlike in the above-mentioned embodiment in which a notable region is specified for each block divided within a predetermined range. This facilitates perceiving, for example, a moving face itself or the contour of the face in a moving image converted into a pictorial image. The face easily attracts attention of a user, and the face as a region easily attracting attention of a user in a moving image converted into a pictorial image can be made conspicuous.

As still another embodiment, the image processing apparatus 1 can use a synthetic image as a moving image represented by moving image data. The synthetic image is, for example, an image obtained by superposing a foreground image on a background image, and is a moving image in which only the foreground image moves in the background image. This moving image data is, for example, synthetic image data (blending image data) containing still image data representing the background image, still image data representing a moving subject (the foreground image), and data representing a locus along which the foreground image moves in the background image. In this case, the synthetic image is a continuation of still images in which the foreground image moves along the locus in the same background image.

The notable-region specification unit 10b specifies, as a notable region, a region of the foreground image which moves along the locus and in which the motion is greater than or equal to a predetermined criterion, between successive still images. The image processor 10c performs image processing on the notable region specified by the notable-region specification unit 10b and on other regions to different processing degrees.

In particular, this method can specify a region of a subject image in each still image as a notable region, unlike in the above-mentioned embodiment in which a notable region is specified for each block divided within a predetermined range. This facilitates perceiving a moving subject image itself in a moving image converted into a pictorial image. Note that the synthetic image data can also be, for example, data representing a plurality of successive synthetic images in which only the foreground image moves in the same background image. In this case, a notable region is specified by the same processing as that of the above embodiment in the synthetic images represented by this synthetic image data, and image processing is performed by distinguishing between the specified notable region and other regions.

As still another embodiment, the image processing apparatus 1 can also specify a value (notability level) indicating the degree of notability of each notable region. More specifically, a correspondence table in which notability levels (e.g., notability levels 1 to 5) are made to correspond, for each predetermined range, to the change of a notable region between still images, the ratio occupied by a notable region in a still image, or the like is recorded in the storage unit 20. By referring to this correspondence table, the notable-region specification unit 10b specifies the notability level of each notable region based on, for example, the change of the notable region or the ratio occupied by the notable region in a still image specified by the notable-region specification unit 10b. For example, the larger the change (e.g., the moving distance of a subject) of a notable region between still images, the higher the notability level of the notable region. Also, the higher the ratio occupied by a notable region in a still image, the higher the notability level of the notable region.

The image processor 10c changes the processing degree of image processing in accordance with the notability level of each notable region specified by the notable-region specification unit 10b. As in the above-mentioned embodiment, the processing degree of image processing is controlled by increasing or decreasing the numerical values of various parameters. More specifically, the image processor 10c performs the image processing by increasing the numerical values (reference values) of various preset parameters as the notability level of a notable region increases. In accordance with the notability level of a notable region specified by the notable-region specification unit 10b, therefore, the image processor 10c can perform image processing of changing the style of each still image by means of different processes.

Furthermore, in this embodiment, the image processor 10c performs the image processing of changing the style of a still image by using different degrees (different image processing processes). However, the image processing can also be performed by using different styles of paintings (e.g., a watercolor painting, color sketch, pastel drawing, pointillistic painting, air brush illustration, oil painting, and gothic oil painting). For example, the image processor 10c can perform the image processing such that an image portion of a notable region specified by the notable-region specification unit 10b is processed as a watercolor painting, and an image portion of the rest is processed as a pointillistic painting. When the image processor 10c thus performs different kinds of image processing on a notable region and the rest (by using different image processing processes), it is possible not only to allow the user to readily perceive a motion region in a moving image converted into a pictorial image, but also to give a new impression to the user.

In the above-mentioned embodiment, a digital camera is taken as an example of the image processing apparatus. However, the image processing apparatus can also be implemented by various devices having an image processing function such as a digital photoframe, personal computer, and cellphone (especially when using moving image data stored in, for example, the storage unit 20 or recording medium 100).

Note that the image processing program of the above embodiment may be recorded in a portable recording medium or the like. Examples of the portable recording medium are Compact Disk Read-Only Memory (CD-ROM) and Digital Versatile Disk Read-Only Memory (DVD-ROM). The image processing program may also be installed in the image processing apparatus from the portable recording medium via various readers. Furthermore, the image processing program may be downloaded and installed in the image processing apparatus from a network such as the Internet via a communication unit (not shown). It is also possible to store the image processing program in a memory such as a server capable of communicating with the image processing apparatus, and issue commands to the CPU or the like. A readable recording medium (e.g., RAM, read-only memory [ROM], CD-R, DVD-R, hard disk, or flash memory) storing the image processing program is a computer-readable program product.

As described above, according to the embodiment of the invention, the user can readily perceive a motion region in a moving image changed into a different style of painting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a moving image data acquisition unit configured to acquire moving image data representing a synthetic image obtained by superposing a moving subject image on a still image;
a notable-region specification unit configured to specify, as a notable region, a region of the moving subject image represented by the moving image data acquired by the moving image data acquisition unit; and
an image processing unit configured to perform image processing of changing a style of the synthetic image into a pictorial image in accordance with predetermined parameters;
wherein the image processing is configured to perform the image processing by using different processing degrees between the notable region in the synthetic image specified by the notable-region specification unit and regions other than the notable region in the synthetic image; and
wherein the image processing performed by the image processing unit comprises:
first image processing of increasing a processing degree by setting numerical values of the parameters to be increased when the image processing is performed on the notable region, and decreasing a processing degree by setting numerical values of the parameters to be decreased when the image processing is performed on the regions other than the notable region; and second image processing of finely rendering a texture of the pictorial image by finely drawing an image portion of the notable region when the image processing is performed on the notable region, and coarsely rendering a texture of the pictorial image by coarsely drawing an image portion of the regions other than the notable region when the image processing is performed on the regions other than the notable region.

2. The apparatus according to claim 1, wherein:
the notable-region specification unit further specifies, for each notable region, a value which changes in accordance with a ratio occupied by the notable region in the synthetic image, and
the image processing unit changes the processing degrees of the image processing in accordance with the value specified by the notable-region specification unit.

3. A non-transitory computer-readable storage medium having a program stored thereon which controls performance of image processing by controlling a computer to perform functions comprising:
acquiring moving image data representing a synthetic image obtained by superposing a moving subject image on a still image;
specifying, as a notable region, a region of the moving subject image in the synthetic image represented by the acquired moving image data; and
performing image processing of changing a style of the synthetic image into a pictorial image in accordance with predetermined parameters;
wherein the image processing is performed by using different processing degrees between the specified notable region in the synthetic image and regions other than the notable region in the synthetic image; and
wherein performing the image processing comprises:
performing first image processing of increasing a processing degree by setting numerical values of the parameters to be increased when the image processing is performed on the notable region, and decreasing a processing degree by setting numerical values of the parameters to be decreased when the image processing is performed on the regions other than the notable region; and
performing second image processing of finely rendering a texture of the pictorial image by finely drawing an image portion of the notable region when the image processing is performed on the notable region, and coarsely rendering a texture of the pictorial image by coarsely drawing an image portion of the regions other than the notable region when the image processing is performed on the regions other than the notable region.

* * * * *